March 28, 1961 E. E. MOTT 2,977,573
PRESSURE COMPENSATED UNDERWATER TRANSDUCER
Filed Dec. 30, 1952 3 Sheets-Sheet 1

INVENTOR
E. E. MOTT
BY
ATTORNEY

March 28, 1961  E. E. MOTT  2,977,573
PRESSURE COMPENSATED UNDERWATER TRANSDUCER
Filed Dec. 30, 1952  3 Sheets-Sheet 2

INVENTOR
E. E. MOTT
BY
ATTORNEY

INVENTOR
E. E. MOTT
BY
ATTORNEY

United States Patent Office 2,977,573
Patented Mar. 28, 1961

2,977,573

PRESSURE COMPENSATED UNDERWATER TRANSDUCER

Edward E. Mott, Upper Montclair, N.J., assignor to Bell Telephone Laboratories, Incorporated, New York, N.Y., a corporation of New York Filed Dec. 30, 1952, Ser. No. 328,629

15 Claims. (Cl. 340—14)

This invention relates to submarine signaling devices and more particularly to low frequency pressure compensated underwater loud speakers.

In the study of submarine sound transmisssion and in the testing and alignment of submarine listening devices, a suitable sound source is required which is capable of generating underwater signals of a constant frequency and high intensity sufficient for long-range operations. An example of a suitable frequency range is that of from 30 to 200 cycles per second at an output of several acoustic watts, and substantially independent of operating depth, which may be in the order of 100 feet or less.

Over and above the acoustic performance characteristics, such a sound source must be of a construction rugged enough to withstand handling and moving, both in and out of water, without danger of damage.

In order to assure a constant acoustic output it is important that the performance characteristics of such a sound source be independent of external pressure, so that the source may be used at various depths and the output is not affected by variations in the depth or by variations due to wave motion, etc. Such a sound source should be of a design readily adapted to be raised and lowered into the water and towed while submerged.

In the past, underwater signaling devices have been designed employing complicated pressure compensating systems. These systems include, for example, a chamber of compressed gas and valve systems which can be actuated to equalize the pressures upon opposite sides of the diaphragm. One difficulty in this type of pressure compensation is that the valves are subject to operation under extremely adverse conditions and required to maintain sensitivity to slight changes in the ambient pressure while the device is submerged in sea water. Other difficulties appear in prior art devices, for example, the diaphragm being exposed to the sea, is subject to fouling by marine life. Moreover, the springs or the like which support the diaphragm are subject to continued mechanical biasing pressures from the sea, which tend to degrade the fatigue properties of the springs and produce breakage at the high amplitudes required for obtaining a strong signal.

With the above-mentioned requirements and prior difficulties in mind, it is an object of this invention to improve the reliability, response and adaptability of submarine signaling devices.

More specifically, it is an object of this invention to realize a submarine signaling device capable of several watts of low frequency acoustic power, irrespective of the ambient pressure.

Another object is to insure that the vibratile members of the device are sealed from exposure to sea water.

It is also an object of this invention to achieve continuous automatic ambient pressure compensation in a submarine signaling device.

Still another object of this invention is to minimize the damping forces upon the vibratile members of the device. Specifically, it is an object to minimize the damping forces caused by the external pressure of the sea upon the device as well as those due to mechanical dissipation in the form of oil flow through narrow passageways, or turbulence within the device arising from actuation of the moving parts.

One embodiment of this invention comprises a cylindrical housing closed at one end and sealed at the other end by an acoustically transparent window. Within the housing adjacent the closed end is a magnet structure of an electromechanical transducer comprising a center pole surrounded by a ring shaped pole, which together form an annular air gap. Within the air gap is a moving coil which is attached to the skirt portion of a domed diaphragm. The diaphragm is mounted for piston-like movement adjacent the acoustic window by a pair of multilegged support spiders, one mounted on an internal baffle of the housing and affixed to the diaphragm adjacent the domed portion and the other extending inward from the housing and attached to the diaphragm at the end of the skirt portion near the coil.

The volume of the housing is divided into three distinct portions by the internal baffle and the ring shaped pole of the magnet structure. The first portion lies between the window and the partition formed by the internal baffle and the diaphragm dome. The second portion lies between the partition and the ring shaped pole of the magnet structure. The third portion is the area within the magnet structure. All of the three portions include communicating openings therebetween, and this volume is filled with oil of suitable viscosity. The oil is free to move from one portion to the next through the restricted opening between the baffle and the diaphragm dome and through the annular air gap in the magnet structure. In the portion of the interior lying between the partition and the magnet structure, an air filled toroidal rubber tube surrounds the skirt portion of the diaphragm. A similar air filled toroidal rubber tube lies within the third portion of the interior and surrounds the center pole of the magnet. The rubber tubes are of prescribed volumetric relationship to absorb any pressure differentials arising from movement of the diaphragm within the housing. The rubber tubes also act to absorb the hydrostatic pressure of the sea transmitted through the acoustic window, thereby relieving the diaphragm and its supports of any pressure inequality.

A feature of this invention involves the enclosure of an electromechanical transducer completely within a housing without materially impairing its performance while submerged.

Another feature of this invention involves the provision of an acoustically transparent resilient wall in a housing which is deformable with changes in hydrostatic pressure without affecting the output of an electromechanical transducer mounted within a housing adjacent the wall.

Another feature involves the provision of internal resilient chambers to compensate for ambient hydrostatic pressure upon the device.

Still another feature of this invention relates to the cooperation of a pair of such chambers so proportioned in volume as to minimize unwanted damping of the device.

A more complete understanding of these and other features of this invention may be had from the following detailed description with reference to the accompanying drawings in which:

Fig. 4 is a cross-sectional view of the embodiment of

Figure 1:
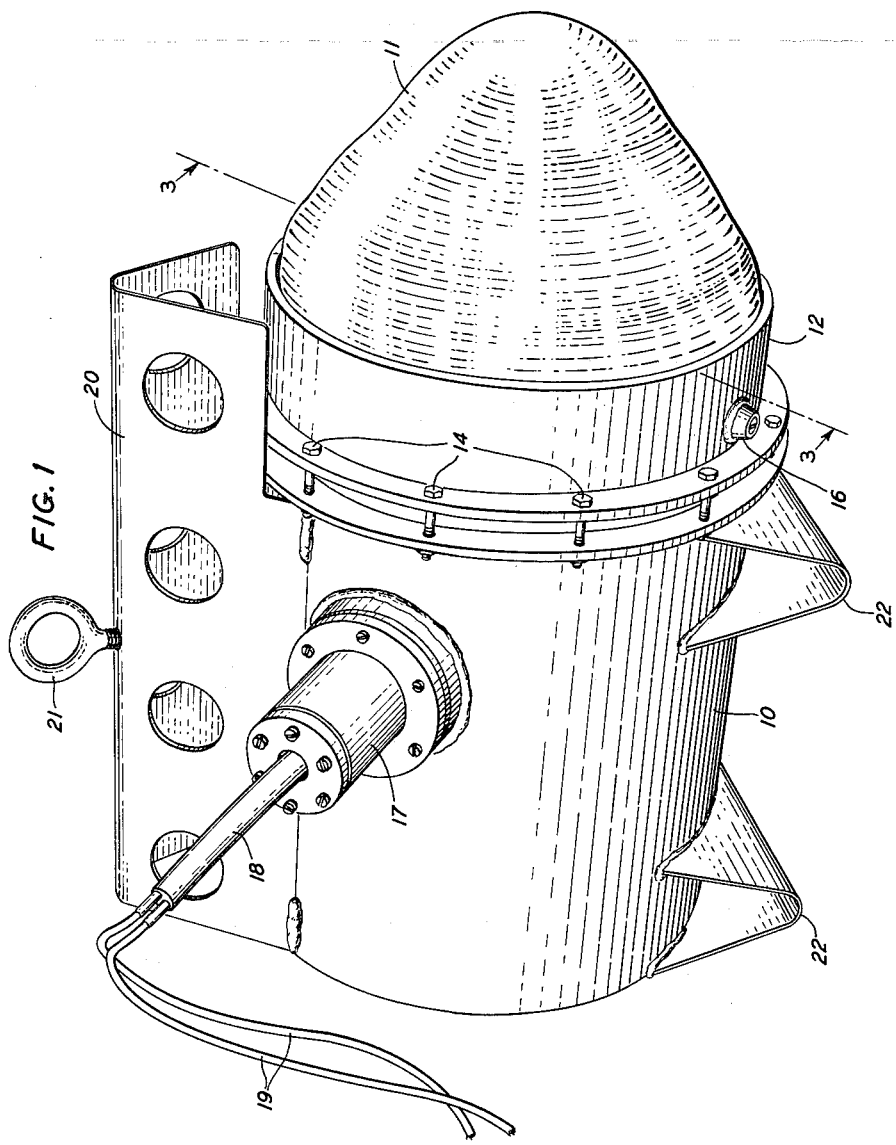
Fig. 1 is a perspective view of a submarine signaling device illustrative of one embodiment of this invention.
Figure 4:
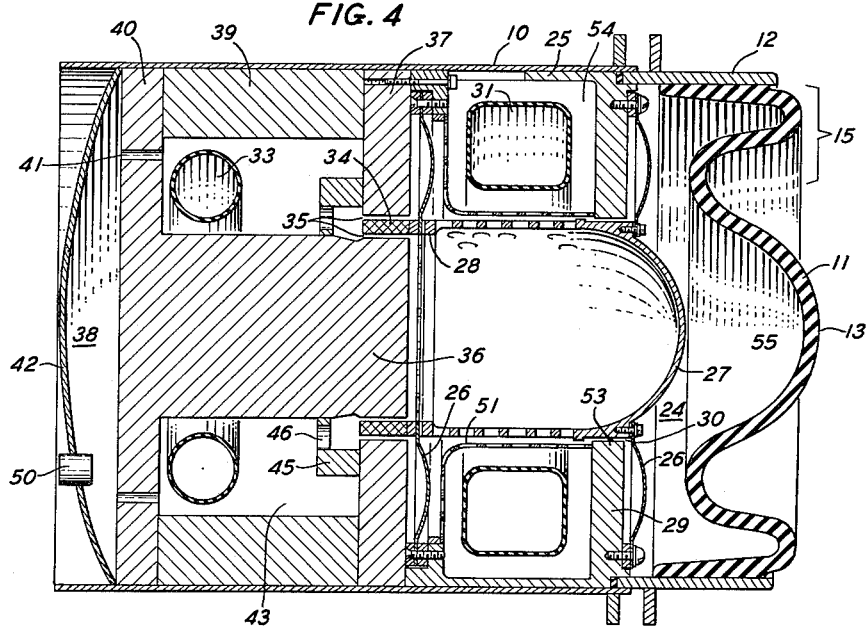
Figure 4A:
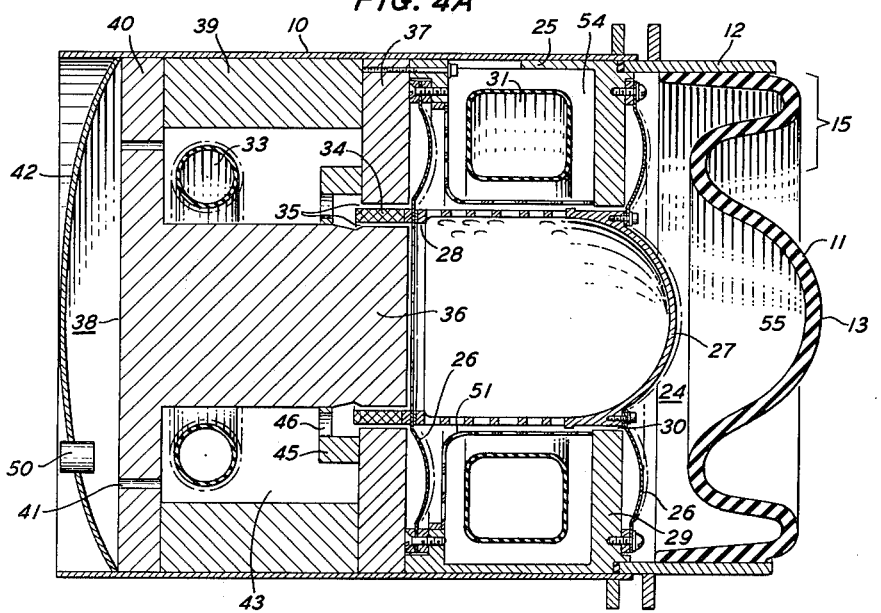

Fig. 1 when the device is subject to an external fluid pressure as when submerged to a depth in the order of 100 feet;

Fig. 4A is a similar view of the embodiment of Fig. 1 under external fluid pressure as in Fig. 4, but with the vibratile members of the device shown in an actuated position.

By reference now to Fig. 1 may be seen an embodiment of this invention including a stainless steel housing 10 having a flexible enclosing acoustic window 11, for example of natural gum rubber which is attached to a flanged housing extension 12. The housing extension 12 is attached to the housing 10 by a series of bolts 14 around its periphery. The acoustic window 11 is shown in its extended form which is somewhat parabolic in shape. Window 11 takes this form when the housing is filled with oil under a pressure in the order of 10 pounds per square inch and the device is exposed to atmospheric pressure.

The housing 10 has mounted on its cylindrical wall a cable gland 17 of conventional design from which emerges a short tube 18 which encloses a pair of conductors 19 which normally lead to a suitable source of electrical power at the surface. Besides the cable gland 17 there are two other openings in the housing 10. They are the bleeder plug 50, best seen in Fig. 3, and a filler plug 16 in the housing extension 12 shown in Fig. 1. Both valves are fully sealed after the device is filled with oil to prevent the entrance of sea water into the housing when it is submerged.

Mechanical fixtures on the exterior of the housing 10 include a pair of legs 22 and a mounting bar 20 welded opposite the legs to strengthen the housing and to form a means for mounting for an eye 21, to which a supporting cable for the device may be attached.

Figure 2:
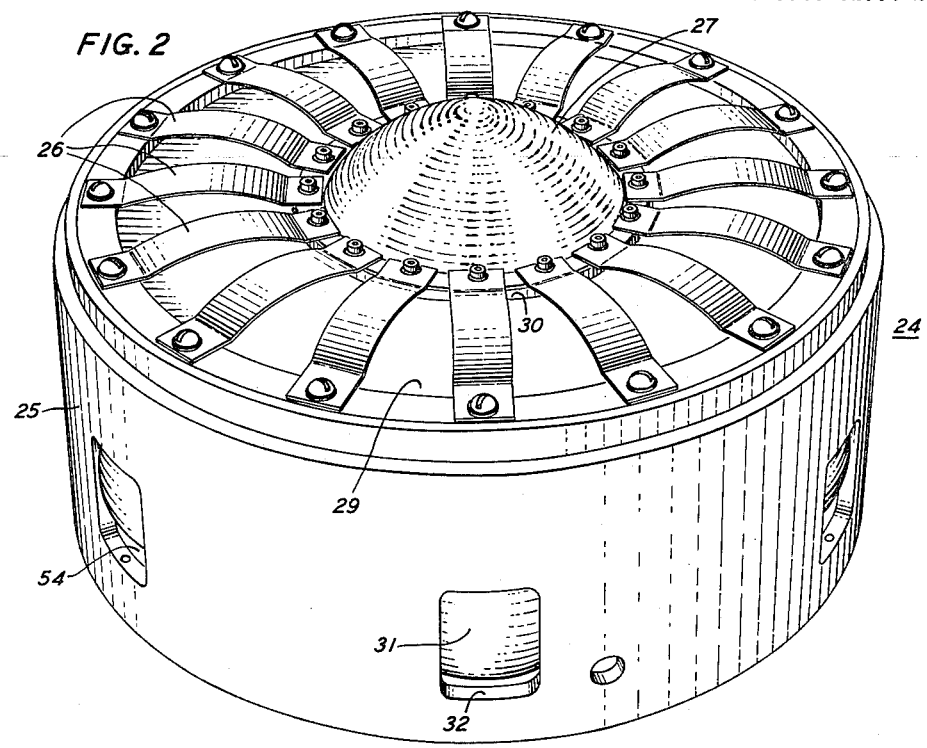
Fig. 2 is a perspective view of the vibratile elements of the embodiment of Fig. 1.

The vibratile assembly 24 of the transducer is shown in Fig. 2. It includes a drum 25, for example of non-magnetic metal, upon which two series of support springs 26 project toward the center of the drum 25, one set at each end. The support springs 26 are advantageously manufactured in an arched form of a high fatigue resistance material such as the alloy known by the trade name of "Elgiloy" produced by The Elgin National Watch Company of Elgin, Illinois. The inner ends of one set of the springs 26 are affixed to the domed portion of the diaphragm 27 and the other set to its skirt portion 28, best seen in Fig. 3. The diaphragm 27, for example of aluminum, which is suspended by the springs 26, is thereby supported for piston-like movement along the axis of the drum 25. The drum 25 includes a baffle 29 which extends inward in the general direction of the springs 26, forming a restricted opening 30 between its inner surface and the diaphragm 27. An air filled rubber tube 31 which is contained within a central portion 54 of the drum 25 may be seen in opening 32.

Figure 3:
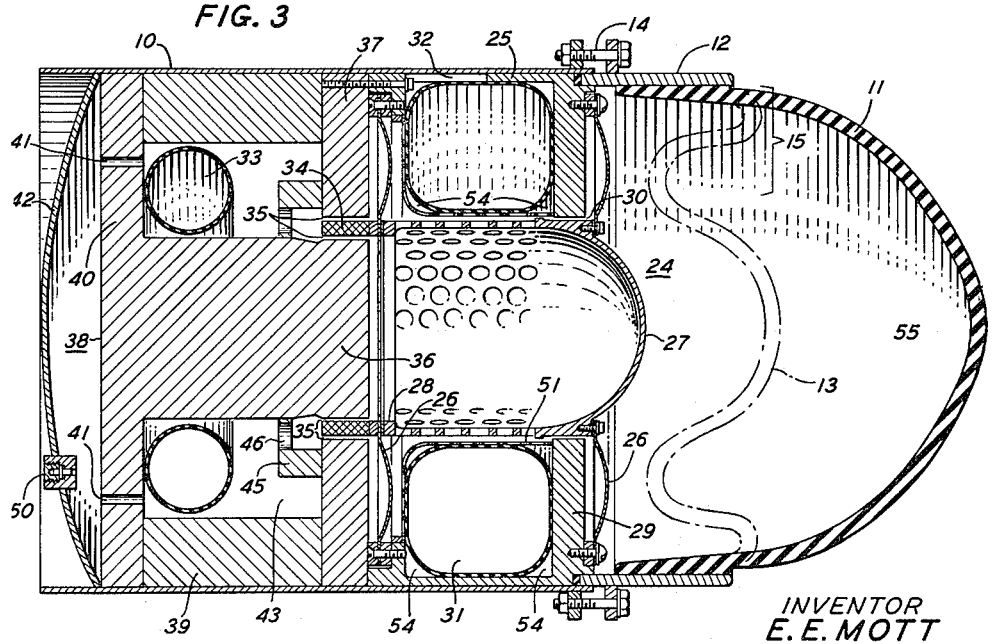
Fig. 3 is a cross-sectional view of the embodiment of Fig. 1 along line 3—3.

The entire vibratile assembly 24 is mounted axially within the housing 10 adjacent the housing extension 12 and window 11, as shown in Fig. 3. A coil 34 extends rearward from the skirt portion 28 of the diaphragm 27 and into an annular air gap 35 which lies between a center pole 36 and a ring shaped pole 37 of the magnetic field structure generally designated 38. This magnetic field structure 38 includes a ring 39 which provides a closed flux path between the center pole 36, its flange portion 40 and the ring shaped pole 37. The flanged portion 40 includes a pair of apertures 41 which allows communication of a wave transmitting medium such as oil between a rear wall 42 of the housing 10 and the space 43 within the magnetic field structure containing an air filled toroidal rubber bag 33. In the rear wall 42 of housing 10 is a bleeder plug 50 which is sealed after the device has been filled with oil. A collar 45 of non-magnetic material encircles the center pole 36, including a series of openings 46 parallel to the direction of movement of the diaphragm 27 and its associated coil 34. The air filled toroidal rubber tube 33 surrounds the center pole 36.

As shown in Fig. 3, the skirt portion 28 of the diaphragm 27 is perforated. Surrounding this portion 28 is a similarly perforated cage 51. The cage 51 encloses the rubber sack 31, and the cage perforations as well as those in the diaphragm skirt 28 allow free movement of a wave transmitting medium, in one embodiment, silicone oil, which fills the housing 10.

The acoustically transparent window 11 is shown attached as by vulcanizing to the inner surface of the housing extension 12 and extending in a generally parabolic shape outward from the housing 10 adjacent the domed portion of the diaphragm 27. The dot-dash lines indicate the unstressed form of the window 11 takes when subject to atmospheric pressure on both faces. This particular configuration insures that compression of this deformable window 11 will not interfere with movement of the diaphragm 27, as would be the case if the window 11 were allowed to be compressed in a concave form toward the interior of the housing.

The acoustic window 11 is molded of natural gum rubber in the corrugated shape shown by the dotted lines of Fig. 3, including a dome portion 13 surrounded by an annular re-entrant portion 15. The dome portion 13 conforms to the shape of the domed diaphragm 27 while being of greater diameter so that all parts of its inner surface are at nearly equal distances from the domed diaphragm 27 regardless of the extent of distortion of the acoustic window itself. The annular re-entrant portion 15 completely surrounds the domed portion 12 and absorbs the changes in shape of the window 11 with ambient pressure changes. The re-entrant portion 15 supports the domed portion 13 for travel in a linear path parallel to the direction of movement of the diaphragm 27 while remaining spaced therefrom. A single re-entrant portion is sufficient to allow the decrease in volume of the housing commensurate with the operating depth. The maximum displacement of the domed portion 13 toward the diaphragm 27 in accordance with this invention is determined to be sufficient to maintain a clearance portion for the maximum change in volume of the housing. When the window 11 is compressed until the decrease in housing volume equals the volume of the sacks, any further compression would be opposed by the relative incompressibility of the oil itself. For example the total volume of the sacks in a specific embodiment of this invention was 400 cubic centimeters while the decrease in housing volume due to the window deformation at a depth of 100 feet was in the order of 300 cubic centimeters. Further decrease of approximately 100 cubic centimeters by distortion of the annular re-entrant portion would approach the 400-cubic-centimeter limit of volume change. The re-entrant portion 15 is of sufficient size to absorb a volume change equal to the volume of sacks 31 and 33, while maintaining a clearance between the dome portion 13 and the diaphragm 27.

In Fig. 4 the embodiment of Figs. 1 and 3 may be seen as the housing is filled with oil and when the device is submerged to a depth of approximately 100 feet. The acoustic window 11 has assumed the general form shown in Fig. 3 by the dotted lines.

As the device is lowered into the sea and the deformable window 11 in bellows-like manner returns to its corrugated form, the wave transmitting medium within the housing flows through a restricted opening 30 between the baffle 29 and the diaphragm 27 into the central portion 54 of the housing interior surrounding the rubber sack 31 and into the interior of the diaphragm 27 through the perforations therein. Hydrostatic pressure on the window 11 will also cause the wave transmitting medium to flow through the air gap 35 into the space 43. The variation in ambient hydrostatic pressure is absorbed by the sacks 31 and 33 which decrease in volume, as is apparent by comparison of their sizes in Fig. 4 and Fig.

3. In this manner variations in hydrostatic pressure upon the device are compensated for wholly within the device by compression of resilient chambers, in this case sacks 31 and 33. Regardless of the volume of sack 31, the cage 50 insures that the sack 33 remains in its allocated position and is not free to interfere with movement of the diaphragm 27. The sack 33 is enclosed within the magnetic field structure 38 and is prevented from interfering with movement of the moving coil 34 by the collar 45. The pressure absorbing means, sacks 31 and 33, are mounted in proximity to the vibratile assembly to absorb pressure differentials in the surrounding medium but are shielded from interference with its movement. The baffle 29 restricts the pressure absorbing action of the sacks 31 and 33 to the central portion 54 and the space 43. When the device is submerged, a state of static pressure equilibrium will be established as the oil flows through the restricted opening 30 and the air gap 35 and the sacks 31 and 33 decrease in volume. The restricted opening 30 offers an extremely high impedance to oil movement at the output signal frequencies so that upon actuation of the diaphragm 27 the signal energy is radiated outward through the acoustically transparent rubber window 11 without loss due to the presence of pressure absorbing means behind the baffle 29.

For operation at low frequency and high acoustic power output, this device involves a diaphragm movement in the order of two tenths of an inch above and below the mean position. Such a movement of a diaphragm, which in one specific embodiment is over 5 inches in diameter, involves a comparatively large volumetric displacement within the central portion 54 and the space 43. This volumetric displacement may be expected to result in pumping of oil through the air gap 35. The pumping of oil would result from pressure differentials between the central portion 54 and the space 43. The pumping of oil and its associated pressure differentials would tend to damp the movement of the diaphragm and in so doing reduce the output of the device. This difficulty is eliminated, however, for the pressure absorbing means, sacks 31 and 33, also act to absorb any pressure changes in the transmitting medium within the housing 10.

In the successful absorption of the slight pressure diffentials, it is incumbent that each of the pressure absorbing means be of such design and relative volumes that they will readily cooperate to accomplish this purpose. For example, the volumetric displacement within the magnetic structure 38 is illustrated in Fig. 4A as the extent of overhang of the voice coil 34 into the space 43. The overhang is the result of rearward actuation of the diaphragm from the mean position shown by dotted lines. The volumetric displacement within the central portion 54 is, however, dependent upon the movement of the domed portion of the diaphragm 27. Actually, the ratio of volumetric displacements between the space 43 and the central portion 54 is in proportion to the cross-sectional area of the diaphragm part extending into each volume. In this case the volumetric displacement varies in the ratio of the area of projection upon a plane perpendicular to the axis of movement. The hydrodynamic pressure within each of the housing portions will also vary inversely with the volumetric displacement. To absorb pressure differentials arising from the decrease in volume in space 43 and central portion 54, the sacks 31 and 33 have been designed to be proportional in volume to the projected area of the diaphragm within each and thus to the volumetric displacement. This relationship may be expressed in the ratio of $$\frac{A1}{A2} = \frac{V1}{V2}$$

where A1 is the projected area of the diaphragm dome; A2 is the projected area of the voice coil; V1 is the volume of the sack 31; and V2 is the volume of the sack 33. Employing this proportion, the oil flow in the air gap will approach zero velocity, and hence damping effects are substantially minimized. Furthermore, this relationship will obtain at all depths within the range of operation. The reduction in volume of the sacks 31 and 33 in compensating for the movement of diaphragm 27 is illustrated in Fig. 4A by the change from the size shown in Fig. 4 which is indicated as a dotted line.

Reliability of operation of this device is insured by the fact that ambient pressure compensation is accomplished completely within the device and with simple means which are able to compensate almost instantaneously for pressure changes. Furthermore, the enclosure of the vibratile members completely within the housing 10, including the acoustic window 11, prevents interference with the output of the device by slight variations in hydrostatic pressure or fouling by marine life. Slight variations in hydrostatic pressure are continually encountered with slight rises and falls of underwater loud speakers due to wave action when it is suspended from a vessel.

The window 11 is fabricated in a form suitable to transmit low frequency signals with slight loss. It expands and contracts in a bellows-like manner and in so doing it conforms in shape to the diaphragm 27 and is spaced therefrom sufficient to allow clearance regardless of the ambient pressure within the range of suitable operating depths. As the window 11 takes the corrugated shape and sacks 31 and 33 absorb that pressure within the device, the pressure on all sides of the diaphragm is equalized and there is no tendency to stress the springs 26. Since the diaphragm 27 moves in an apparently compressible medium, the springs 26 comprise substantially all of the stiffness of the system. The internal absorption of hydrostatic pressure without increasing the stiffness of the system insures that the acoustic output of the loud speaker is independent of depth in its operating range. The stiffness in the springs of the system in this device is determinative of the operating frequency range and particularly the resonant frequency. In one specific embodiment of this invention, a rather broad resonance peak at approximately 60 cycles per second resulted in an output in the order of 2 watts of acoustic power, for an input of 250 watts of electrical power, which is considerable for low frequency underwater sound projectors. The high output of this device has been utilized in signaling over a range of many miles with a signal level which is readily detectable above water noise. By introducing a predetermined amount of additional stiffness into the system in the form, for example, of heavier spring supports, the resonant frequency can be increased to approximately 100 cycles per second with an increase in output to approximately 10 watts of acoustic power, with a substantial increase in signal transmission range.

Further modification of the device in the form of an addition of another resilient sack which is mounted within the diaphragm for movement with that member may be made. The additional sack will serve the purpose of reducing the mass of oil within the diaphragm which is moved upon diaphragm actuation. Such modifications are considered to be within the scope of this invention.

It is to be understood that the above-described arrangements are illustrative of the application of the principles of the invention. Numerous other arrangements may be devised by those skilled in the art without departing from the spirit and scope of the invention.

What is claimed is:

1. A submarine signaling device comprising a housing, a wave transmitting medium within said housing, an electromechanical transducer immersed within said medium, and an acoustically transparent window supported at its periphery in a wall of said housing, said window including a central portion conforming to the shape of the vibratile member of said transducer at all pressures in the range of normal operating depths of said device and an annular re-entrant portion surrounding said central portion and deformable to equalize ambient pressure changes upon the device.

2. A submarine signaling device comprising a housing, a wave transmitting medium within said housing, an electromechanical transducer immersed within said medium, and an acoustically transparent window in a wall of said housing, said window including a central portion conforming in shape to the vibratile member of said transducer at all pressures in the range of normal operating depths of said device and spaced therefrom, said central portion solely supported from the vibratile member by a re-entrant edge portion, said re-entrant edge portion alone being deformable to equalize changes in ambient pressure upon the device.

3. The device in accordance with claim 2 wherein said central portion is of greater size than the vibratile member of said transducer.

4. The device in accordance with claim 2 wherein said edge portion comprises an annular corrugation surrounding said central portion.

5. A submarine signaling device comprising a housing, a wave transmitting medium within said housing, an electromechanical transducer including a domed vibratile member completely enclosed within said housing, and an acoustically transparent window forming a wall of said housing adjacent the domed vibratile member and spaced therefrom, said window including a domed portion aligned with the domed vibratile member of the transducer, said domed portion surrounded by an annular re-entrant portion and said window being deformable with changes in hydrostatic pressure on the device while maintaining a clearance between the vibratile member and domed portion.

6. A low frequency submarine signaling device comprising a housing, an acoustically transparent deformable window in a wall of said housing, an electromechanical transducer including a diaphragm immersed in a signal transmitting medium in said housing, and gas filled resilient means within said housing for absorbing hydrostatic pressure transmitted through said housing window upon submersion of the device, said gas filled resilient means being positioned adjacent to and behind the diaphragm of said electromechanical transducer to absorb pressure differentials at the operating frequency of the transducer developed behind said diaphragm.

7. A low frequency submarine signaling device comprising a housing, a deformable acoustically transparent window in a wall of said housing, an electromechanical transducer positioned within said housing, said transducer including a diaphragm mounted for piston-like motion, a driving coil coupled to said diaphragm and a magnetic field structure forming an air gap in which said coil is movable, a wave transmitting medium within said housing, and a pair of gas filled resilient means within said housing for absorbing pressure within said device, said gas filled resilient means positioned adjacent the moving elements of said transducer.

8. The device in accordance with claim 7 wherein said resilient means comprises a pair of compressible closed gas filled tubes.

9. The device in accordance with claim 7 wherein one of said pair of resilient means is positioned on each side of the air gap in said magnetic field structure.

10. The device in accordance with claim 7 wherein the volume of the first of said pair of resilient means is in proportion to the volume of the second of said pair of resilient means in the ratio of the volumetric displacement of the wave transmitting medium upon diaphragm actuation at the end of the air gap adjacent the first resilient means to the volumetric displacement of the wave transmitting medium at the end of the air gap adjacent the second resilient means.

11. A low frequency submarine signaling device comprising a housing, a deformable acoustically transparent window in a wall of said housing, an electromechanical transducer immersed within a wave transmitting medium in said housing, said transducer including a vibratile member adapted to transmit acoustic signals through said window, pressure differential absorbing chambers within said housing, and means positioned between said pressure differential absorbing chambers and said window for shielding said pressure differential absorbing chambers from pressure differentials in the region of said vibratile member and acoustic window at the output signal frequencies of the device.

12. The device in accordance with claim 11 wherein said shielding means comprises a baffle surrounding said vibratile member.

13. The device in accordance with claim 12 wherein said baffle and vibratile member form an opening which offers high impedance to the passage of the wave transmitting medium at the output signal frequencies of the device.

14. A low frequency submarine signaling device comprising a housing, a pressure deformable acoustically transparent window in a wall of said housing, an electromechanical transducer positioned within said housing, said transducer including a diaphragm mounted for piston-like movement adjacent said window but spaced therefrom, a coil attached to said diaphragm, and a magnetic field structure forming an air gap about said coil, baffle means surrounding said diaphragm, said magnetic field structure and baffle means dividing the interior of said housing into distinct compartments, one of which includes said window, said compartments joined by a restricted annular opening between the diaphragm and baffle means and a restricted annular opening between the coil and magnetic field structure, and a compressible gas filled tube within the compartments of said housing remote from said window.

15. A low frequency submarine signaling device comprising a housing, a pressure deformable acoustically transparent window in a wall of said housing, an electromechanical transducer positioned within said housing, said transducer including a diaphragm mounted for piston-like movement adjacent said window but spaced therefrom, a coil attached to said diaphragm, and a magnetic field structure forming an annular air gap about said coil, baffle means surrounding said diaphragm, said magnetic field structure and baffle means dividing the interior of said housing into three compartments one of which includes said window, and toroidal pressure absorbing gas filled tubes in the compartments of the housing interior remote from said window and adjacent said air gap whereby hydrostatic pressure transmitted through said window upon submersion and pressure differentials within the housing in the region of the air gap upon actuation of the diaphragm are absorbed by said toroidal tubes.

References Cited in the file of this patent

UNITED STATES PATENTS

| | | |
|---|---|---|
| 1,624,412 | Horton | Apr. 12, 1927 |
| 2,390,847 | Olson | Dec. 11, 1945 |
| 2,410,806 | Black | Nov. 12, 1946 |
| 2,429,104 | Olson | Oct. 14, 1947 |
| 2,460,274 | Beinoff | Feb. 1, 1949 |
| 2,490,595 | Merten | Dec. 6, 1949 |